US008983475B2

(12) United States Patent
Gopalakrishnan (10) Patent No.: US 8,983,475 B2
(45) Date of Patent: Mar. 17, 2015

(54) SYSTEM AND METHOD FOR PARTNER NETWORK SHARING ARCHITECTURE (71) Applicant: FutureWei Technologies, Inc., Plano, TX (US)

(72) Inventor: Nandu Gopalakrishnan, Chatham, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 45 days.

(21) Appl. No.: 13/732,133

(22) Filed: Dec. 31, 2012

(65) Prior Publication Data
US 2013/0267229 A1 Oct. 10, 2013

Related U.S. Application Data (60) Provisional application No. 61/599,741, filed on Feb. 16, 2012.

(51) Int. Cl.
H04W 36/00 (2009.01)
H04W 4/00 (2009.01)
H04W 36/14 (2009.01)

(52) U.S. Cl.
CPC ...... *H04W 36/0061* (2013.01); *H04W 36/0083* (2013.01); *H04W 4/00* (2013.01); *H04W 36/14* (2013.01)
USPC .......................... 455/440; 455/436; 455/439

(58) Field of Classification Search
CPC .............. H04W 36/00; H04W 36/005; H04W 36/0083; H04W 36/061; H04W 36/165; H04W 36/14; H04W 4/00

USPC ........ 455/432.1, 435.1, 435.2, 438, 439, 449, 455/434, 433, 436, 440, 441, 442, 422.1
See application file for complete search history.

(56) References Cited

U.S. PATENT DOCUMENTS

| 8,369,852 | B2 * | 2/2013 | Buckley et al. ............... 455/434 |
| 2003/0013443 | A1 | 1/2003 | Willars et al. |
| 2003/0197796 | A1 | 10/2003 | Taubman |
| 2005/0101288 | A1 * | 5/2005 | Hulkkonen et al. ........ 455/404.1 |
| 2005/0260997 | A1 * | 11/2005 | Korale et al. ............... 455/452.2 |
| 2006/0073831 | A1 * | 4/2006 | Guyot et al. ................... 455/443 |
| 2006/0183502 | A1 * | 8/2006 | Jeong et al. .................... 455/560 |
| 2007/0083470 | A1 | 4/2007 | Bonner et al. |
| 2007/0202877 | A1 * | 8/2007 | Hogan .......................... 455/436 |
| 2008/0102896 | A1 | 5/2008 | Wang et al. |
| 2008/0267127 | A1 | 10/2008 | Narasimha et al. |
| 2011/0261217 | A1 | 10/2011 | Muukki et al. |
| 2011/0300866 | A1 * | 12/2011 | Ali et al. ....................... 455/436 |
| 2012/0044869 | A1 * | 2/2012 | Tiwari ........................... 370/328 |

(Continued)

OTHER PUBLICATIONS

Applicant: Huawei Technologies, Inc., Notification of Transmittal of The International Search Report and The Written Opinion of the International Searching Authority, or The Declaration, dated Jun. 5, 2013, 12 pages.

*Primary Examiner* — Jean Gelin
(74) *Attorney, Agent, or Firm* — Slater & Matsil, L.L.P.

(57) ABSTRACT

A system and method for a partner network sharing architecture is provided. In an embodiment a piece of user equipment that is part of a partner network is handed off or otherwise attached to a wholesale network. The identification of the partner network that the piece of user equipment originated from is determined by an ordering of a list of PLMN IDs that is transmitted to the wholesale network.

46 Claims, 6 Drawing Sheets

(56) References Cited

U.S. PATENT DOCUMENTS

| | | | |
|---|---|---|---|
| 2012/0052911 A1* | 3/2012 | Chin et al. | 455/558 |
| 2012/0157095 A1* | 6/2012 | Fodor et al. | 455/434 |
| 2012/0202492 A1* | 8/2012 | Moisanen | 455/435.1 |
| 2012/0231760 A1* | 9/2012 | Zhu et al. | 455/404.1 |
| 2013/0003697 A1* | 1/2013 | Adjakple et al. | 370/331 |
| 2013/0053037 A1* | 2/2013 | Jokinen et al. | 455/436 |
| 2013/0077517 A1* | 3/2013 | Cho et al. | 370/252 |
| 2013/0163560 A1* | 6/2013 | Diachina et al. | 370/331 |
| 2013/0183971 A1* | 7/2013 | Tamaki et al. | 455/436 |
| 2013/0189978 A1* | 7/2013 | Lee et al. | 455/434 |

* cited by examiner

SYSTEM AND METHOD FOR PARTNER NETWORK SHARING ARCHITECTURE

This application claims the benefit of U.S. Provisional Application No. 61/599,741, filed on Feb. 16, 2012, entitled "System and Method for Partner Network Sharing Architecture," which application is hereby incorporated herein by reference.

TECHNICAL FIELD

The present invention relates to a system and method for wireless communications, and, in particular embodiments, to a system and method for partner network sharing architecture.

BACKGROUND

Mobile Network Sharing is an ever growing area driven by the opportunity for operators/service providers to reduce their costs (as ARPU due to data declines) by sharing CAPEX and OPEX of spectrum, sites, access and core network equipment while still allowing for significant service differentiation. Wholesaling is a generalization of Mobile Network Sharing wherein multiple retail partners (using different models or architectures of network sharing) purchase the capacity and user licenses in the RAN and EPC from a Wholesale Operator who is responsible for building, operating and maintaining the network. A typical model of a partner's UE to seek services with the Wholesale Operator is Offloading; another model is Coverage Extension; a third model is pure Mobile Virtual Network Operation.

A Wholesale Operator is an entity that owns radio frequency spectrum, and owns and operates a regional Public Land Mobile Network (PLMN) comprising wide area, cellular radio access and associated core networks, logical parts of which are allocated (in a controlled manner) for the use of partners/retailers who in turn offer services (e.g., packet data network) to their UEs. The controlled, possibly dynamic allocation of network resources mentioned above is known as Network Sharing and there are several modes/architectures possible for this.

Network Sharing Architecture deals with the various sharing modes possible that specify details such as who owns and operates which network element and if they are shared and how shared (Wholesale Operator network) network elements interface with the partner network elements. Network Sharing Architecture deals with this concept on a general basis wherein a single Wholesale Operator (shared) network may interface simultaneously with different partners each with its own method (or architecture) for sharing. Network Sharing Architecture also deals with how the partner is advertised in the Wholesale Operator (shared) eNodeB (eNB) network, i.e., through either a broadcast PLMN ID or an equivalent PLMN ID (for example, the Wholesale Operator's own PLMN ID) and in particular, how the partner (home operator) PLMN ID or partner ID associated with a UE connecting to a shared eNB and to a shared Mobility Management Entity (MME) is identified.

Mobility Management consists of Redirection, Handover, or Cell Reselection. Partner Identification of each UE being "offloaded" to or seeking access to services in the Wholesale Operator Network helps properly deploy the appropriate partner specific Mobility Management procedures.

SUMMARY

An embodiment method of partner identification in a shared network entity, the method comprising generating a handover communication with a processor of the shared network entity, is provided. The generating the handover communication comprises generating a list of one or more equivalent identifications, wherein one of the one or more equivalent identifications is an identifier of an originating partner network, and placing the identifier of the originating partner network into a pre-agreed location within the handover communication. The handover communication is transmitted from the shared network entity.

An embodiment shared network entity comprises a memory and a processor coupled to the memory. The processor is configured to generate a handover communication with a list of public landmobile network (PLMN) IDs, wherein the generating the handover communication comprises placing an indication of a partner network identification into a pre-agreed location within the handover communication, and to send the handover communication for transmission.

An embodiment method of partner identification in a shared network entity comprising receiving a handover communication, the handover communication comprising a list of equivalent public landmobile network (PLMN) IDs is provided. The handover communication is analyzed with a processor of the shared network entity, the analyzing the handover communication further comprising looking in a pre-arranged location within the list of equivalent PLMN IDs to find an indication of an originating partner network identity.

An embodiment shared network entity comprising a memory and a processor coupled to the memory is provided. The processor is configured to receive a handover communication and analyze the handover communication, wherein the analyzing the handover communication further comprises looking in a pre-arranged location within the handover communication to find an indication of a partner network identity.

An embodiment method of determining a partner identification (ID) by a shared network entity comprising receiving a non-access stratum (NAS) message from a user equipment (UE) via another network entity and extracting a public land mobile network (PLMN) ID from the NAS message is provided. When the extracted PLMN ID is not a wholesale operator ID, the PLMN ID is used as the partner ID. When the extracted PLMN ID is the wholesale operator ID, then an international mobile subscriber identity (IMSI) for the UE is obtained, and the partner ID is determined in accordance with the IMSI for the UE.

An embodiment shared network entity comprising a memory and a processor coupled to the memory is provided. The processor is configured to receive a non-access stratum (NAS) message from a user equipment (UE) via another network entity and extract a public land mobile network (PLMN) identification (ID) from the NAS message. When the extracted PLMN ID is not a wholesale operator ID, then the PLMN ID is used as a partner ID. When the extracted PLMN ID is the wholesale operator ID, then an international mobile subscriber identity (IMSI) for the UE is obtained, and the partner ID is determined in accordance with the IMSI for the UE.

An embodiment method of determining a partner identification (ID) by a shared network entity comprising receiving a connection message from a user equipment (UE) via another network entity and extracting an indication of identity from the connection message is provided. When the indication of identity is a wholesale network identity, a handover communication is analyzed with a processor of the shared network entity, wherein the analyzing the handover communication comprising looking in a pre-arranged location within a handover communication to determine the origination identity of the user equipment. When the indication of identity is a mapped identity, the handover communication is analyzed with the processor of the shared network entity, wherein the analyze the handover communication comprises looking in a pre-arranged location within a handover communication to determine the origination identity of the user equipment.

An embodiment shared network entity comprising a memory and a processor coupled to the memory is provided. The processor is configured to receive a connection message from a user equipment (UE) via another network entity and extract an indication of identity from the connection message. When the indication of identity is a wholesale network identity, the processor looks in a pre-arranged location within a handover restriction list to determine the origination identity of the user equipment. When the indication of identity is a mapped identity, the processor looks in a pre-arranged location within a handover restriction list to determine the origination identity of the user equipment.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An embodiment solves a problem with Partner Identification given an arbitrary mixture of LTE Network Sharing architectures adopted by a Wholesale Operator, one architecture per retail partner. An embodiment provides a pair of partner identification algorithms (one at the RAN and one at the MME) that identifies the partner network or Public Land Mobile Network (PLMN) ID associated with a UE that has been offloaded into or is about to receive service in a shared network or Wholesale Operator Network. These algorithms are general enough to support a wide variety of Network Sharing Architectures (e.g., MOCN, GWCN, etc.). Partner Identification helps a host of features and services offered by the shared network to work properly.

Additionally, embedded within the algorithms is a component that provides a solution to the difficult case of Network Sharing Architectures that use a many-to-one mapping of an original PLMN ID, such as an Equivalent PLMN ID or a specially mapped Broadcast PLMN ID. Thirdly, another embedded component provides a partner identification solution to the other difficult case of Pure Mobile Virtual Network Operator (PMVNO) that cannot be represented by the usual PLMN ID.

In an embodiment, Partner Identification of a UE at the "shared" RAN (e.g., a eNodeB) and a shared MME of a Shared Network or Wholesale Network Operator helps with the functioning of other features of shared network Resource Management, Mobility Management, QoS and Service Management etc. An embodiment provides Partner Identification for UEs offloaded to or seeking service in a Shared Network, which assists with several eNB and EPC functions such as: Resource Control, Mobility Management, QoS Management, UE registration, SGW selection, target MME selection, Resource and Usage Tracking etc.

In an embodiment, the algorithm(s) support a mixture of a variety of Network Sharing Architectures. An embodiment uses a message with a private convention between the MME and the shared RAN to recoup the lost information due to the many-to-one PLMN ID mapping used in Equivalent PLMN ID and Mapped Broadcast PLMN ID architectures. Also, an embodiment can support Pure Mobile Virtual Network Operators.

Embodiments may be applied to any LTE Wholesale or Network Sharing Model, and to particular devices such as LTE eNodeBs and MMEs running software code to identify the partner/PLMN ID associated with a UE for various Network Sharing Architectures.

Figure 1:
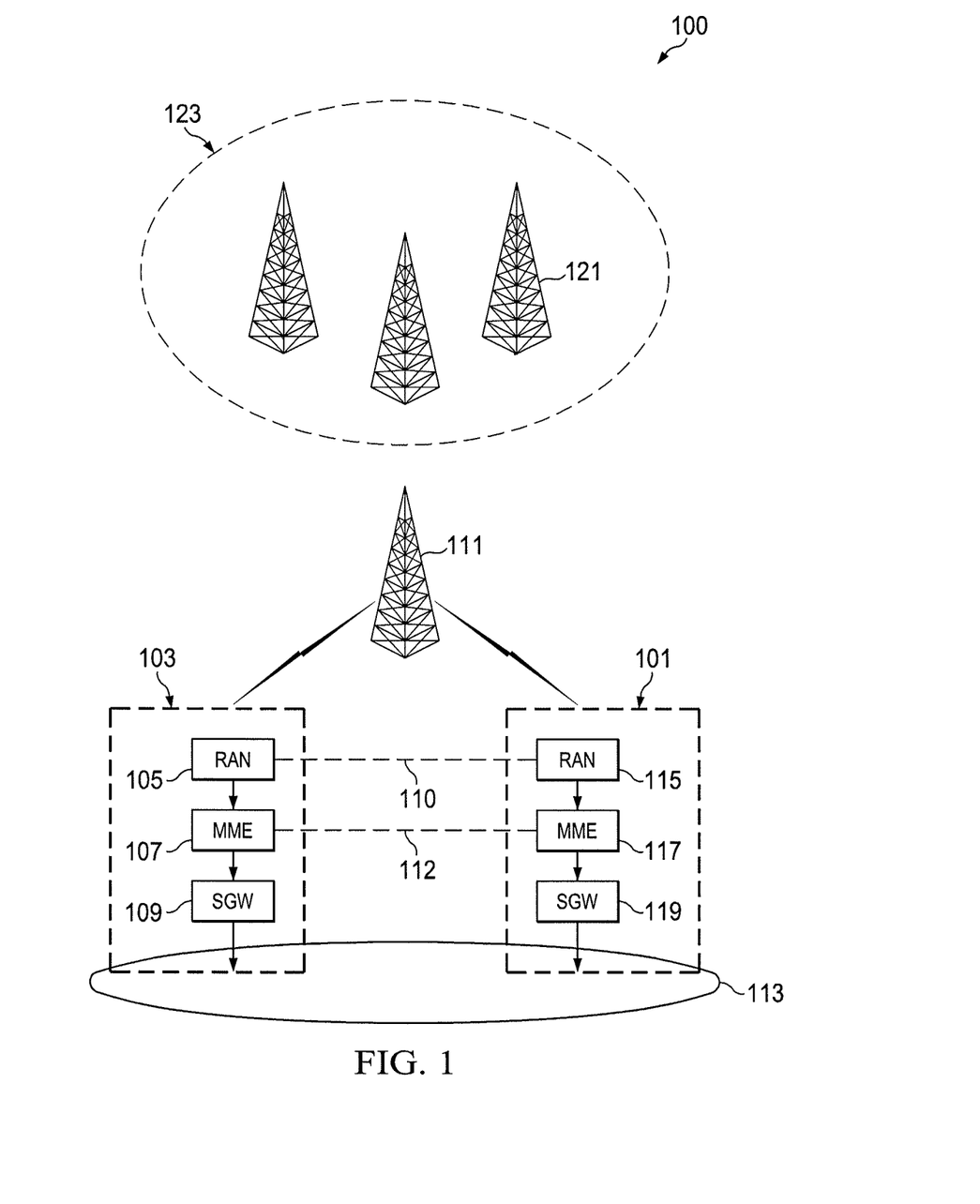
FIG. 1 illustrates a wholesale network connected to partner networks.

With reference now to FIG. 1, there is illustrated a network system 100 with a wholesale network 101 and a partner network 103. In an embodiment the partner network 103 may comprise a first radio access network (RAN) 105 communicably coupled with a first mobility management entity (MME) 107, which is communicably coupled with a first serving gateway (SGW) 109. Collectively the partner network 103 is used to provide a communication link between a piece of first user equipment (UE) 111 and a larger network 113.

In an embodiment the first RAN 105 is a base station that provides access and communication to and from the UE 111. In an embodiment the first RAN 105 is an evolved Node B (eNB) that directly communicates with the first UE 111 and provides uplink and downlink information to the first UE 111 within the partner network 103. Alternatively, the first RAN 105 may be an access network (AN), an access point (AP), or the like, and all such suitable alternatives are fully intended to be included within the scope of the embodiments.

The first MME 107 is utilized to manage the mobility of the connection of the first UE 111 while it is communicating with the first RAN 105. In an embodiment the first MME 107 stores such information as the first UE's 111 user ID, user status, and tracking area. The first MME 107 is also utilized to perform authentication and key management, encrypting signals, protecting the integrity of the signal, and controlling signaling interaction. Additionally, the first MME 107 may interact with other MMEs (e.g., a second MME 117, described further below) to perform such functions as user ID authentication.

The first SGW 109 is utilized to handle and manage the routing and forwarding of data to and from the first MME 107. The first SGW 109 is also utilized to handle compressing data header and relaying and routing data packets to and from the first UE 111. Finally, the SGW 109 is used store the context of the first UE's 111 information such as IP bearer information, routing information, and the like.

The first SGW 109 is connected to the first network 113. The first network 113 may be, e.g., the internet or any other suitable system of computers that are networked together to provide intercommunication between the computers. Any suitable network that the first UE 111 may attempt to communicate with is fully intended to be included within the scope of the embodiments.

Additionally, while the partner network 103 is described above as having the first RAN 105, the first MME 107, and the first SGW 109, these elements are intended to be illustrative and are not intended to be limiting. Rather, the partner network 103 may have additional and/or different units or modules performing similar or additional functions. For example, the partner network 103 may also comprise a Home Subscriber Service (HSS), a Packet Data Network Gateway (PDNGW), an Online Charging System (OCS), a serving network, a WLAN access network, combinations of these, or the like. All such units, modules, and any combination of units and modules, are fully intended to be included within the scope.

The wholesale network 101 may comprise similar elements as the partner network 103, although the wholesale network 101 deploys components that are independent of the components of the partner network 103. For example, in an embodiment the wholesale network 101 may comprise a second RAN 115, a second MME 117, and a second SGW 119 that are similar to the first RAN 105, the first MME 107, and the first SGW 109, respectively, described above. However, alternatively, the wholesale network 101 may have different components or even similar components with different functionalities, than the partner network 103.

In an embodiment the first UE 111 is a member of the partner network 103. In particular, the user of the first UE 111 pays or is otherwise given permission to connect the first UE 111 to the partner network 103. Once connected, the first UE 111 will transmit and receive information, such as telephone voice data, messaging data, streaming data, webpage data, or any other data to and from the first RAN 105. This information will then be routed and/or forwarded, encrypted and handled by the components of the partner network 103 so that the first UE 111 may communicate with the larger network 113.

However, the partner network 103 may not at all times have sufficient resources to handle the communications with the first UE 111 along with other UEs (not individually illustrated in FIG. 1) that may be connected to the partner network 103. For example, the partner network 103 may not have sufficient bandwidth to handle the addition of the first UE 111 due to other communications to which the partner network 103 is dedicated, or the first UE 111 may have moved too far away from the first RAN 105 and the signal strength has decreased below a threshold for maintaining a desired quality of service.

At such a time, if available, the partner network 103 may attempt to direct the first UE 111 to another network owned by the same owner (not individually illustrated) as the partner network 103. However, if another network owned by the same owner as the partner network 103 is not available or else is simply not present, the partner network 103 may have an agreement with the wholesale network 101 to borrow or share the resources of the wholesale network 101. As such, the partner network 103 may direct the first UE 111 to connect to the wholesale network 101 (e.g., through the second RAN 115) and to share one or more of the resources of the wholesale network 101.

Such a sharing of resources may be managed in a multitude of fashions and architectures, depending upon how many or how few of the wholesale network's 101 resources the partner network 103 is willing to use and/or pay for. For example, in a multi-operator core network (MOCN) architecture, which is discussed in the 3GPP standards, only the wholesale network's 101 RAN (e.g., the second RAN 115) is shared with the partner network 103. Other network elements such as the MME, the SGW, PGWs, HSSs, PCRFs, etc., are owned and/or controlled by the partner network 103. The MOCN architecture implies that a partner specific PLMN ID is broadcast in the shared RAN (e.g., the second RAN 115) in order for the attaching/reselecting/redirected/service requesting partner first UE 111 to select it to help route the corresponding non-access stratum (NAS) messages to the appropriate MME (e.g., the first MME 107 in the partner network 103).

As another example, in a gateway core network (GWCN) architecture, which is also discussed in the 3GPP standards the wholesale network's 101 RAN (e.g., the second RAN 115) and the wholesale network's 101 MME (e.g., the second MME 117) are shared with the partner network 103. However, other networks elements, such as the SGW, PGWs, HSSs, PCRFs, etc., are owned and/or controlled by the partner network 103. In an embodiment the shared RAN (e.g., the second RAN 115) broadcasts the partner network's 103 PLMN ID, and furthermore the shared MME (e.g., the second MME 117) has multiple Gateway User MMEIDs GUMMEIDs (constructed in accordance with S1 flex rules). One of the GUMMEIDs has a PLMN ID prefix of each partner network 103 besides the one with a PLMN ID prefix of the wholesale network 101. This allows the first UE 111 registering with the wholesale network's 101 shared MME (e.g., the second MME 117) to virtually register with the partner network 103 so that its Registered PLMN ID (RPLMN ID prefixing the allocated Globally Unique Temporary Identifier (GUTI) is the partner network's 103 PLMN ID.

Yet another architecture is an Equivalent PLMNID GWNC (EGWCN) architecture, in which the wholesale network's 101 RAN (e.g., the second RAN 115) and MME (e.g., the second MME 117) are shared with the partner network 103 and other network elements such as SGW, PGW, HSS, PCRF etc. are owned/controlled by the partner network 103. However, in this architecture, the shared RAN (e.g., the second RAN 115) does not broadcast the partner network's 103 PLMN ID. Rather, it broadcasts an equivalent PLMN ID for the partner network's 103 first UEs 111 in the wholesale network 101. In particular, the shared RAN (e.g., the second RAN 115) broadcasts the wholesale network's 101 PLMN ID that is considered as equivalent in the partner network's 103 first UEs 111. Furthermore, the shared MME (e.g., the second MME 117) does not have a GUMMEID with a PLMN ID prefix of the partner network 103 but does have the GUMMEID with a PLMN ID prefix of the wholesale network 101. Therefore, the partner network's 103 first UE 111 registers with the wholesale network's 101 shared MME (e.g., the second MME 117) so that its RPLMN ID (prefixing the allocated GUTI) is the wholesale network's 101 PLMN ID.

In yet another architecture, known as a Home Routed (HR) architecture, the wholesale network's 101 shared RAN (e.g., the second RAN 115), MME (e.g., the second MME 117), and SGW (e.g., the second SGW 119) are shared with the partner network 103. Other network elements such as PGW, HSS, PCRF etc. are owned/controlled by the partner network 103. In an embodiment of the HR architecture the shared RAN (e.g., the second RAN 115) does not broadcast the partner network's 103 PLMN ID. Rather, it broadcasts an equivalent PLMN ID for the partner network's 103 first UE 111 in the wholesale network 101. In particular, the shared RAN (e.g., the second RAN 115) broadcasts the wholesale network's 101 PLMN ID that is considered as equivalent in the partner network's 103 first UE 111. Furthermore, the shared MME (e.g., the second MME 117) does not have a GUMMEID with a PLMN ID prefix of the partner network 103. Rather, it has the GUMMEID with a PLMN ID prefix of the wholesale network 101. Therefore, the partner network's 103 first UE 111 registers with the wholesale network's 101 shared MME (e.g., the second MME 117) so that its RPLMN ID (prefixing the allocated GUTI) is the wholesale network's 101 PLMN ID.

In yet another architecture, known as a Modified Home Routed (MHR) architecture, the wholesale network's 101 RAN (e.g., the second RAN 115), MME (e.g., the second MME 117) and SGW (e.g., the second SGW 119) are shared with the partner network 103. Other network elements such as PGW, HSS, PCRF etc. are owned/controlled by the partner network 103. In an embodiment of the MHR architecture, the shared RAN (e.g., the second RAN 115) broadcasts the partner network's 103 PLMN ID (or a new PLMNID allocated just for that partner network 103), and furthermore the shared MME (e.g., the second MME 117) has multiple GUMMEIDs, one with a PLMN ID prefix of the partner network 103 (or the new PLMNID allocated just for that partner network 103) besides the one with a PLMN ID prefix of the wholesale network 101. This allows the partner network's 103 first UE 111 registering with the wholesale network's 101 shared MME (e.g., the second MME 117) to virtually register with the partner network 103 so that its RPLMN ID (prefixing the allocated GUTI) is the partner network's 103 PLMN ID (or the new PLMNID allocated just for that partner network 103).

In yet another architecture, known as a pure mobile virtual network operator (PMVNO), all network elements such as the RAN, the MME, the SGW, PGW, HSS, PCRF etc. are owned/controlled by the wholesale network 101. The partner network 103 does not operate its own PLMN and does not possess a PLMN ID. The partner network's 103 first UE 111 is allocated an International Mobile Subscriber Identity (IMSI) from a range of addresses in the wholesale network's 101 IMSI space. The first UE 111 selects the wholesale network's 101 PLMN ID (that is its Home PLMN (HPLMN) or an Equivalent Home PLMN (EHPLMN)) broadcast by the shared RAN (e.g., the second RAN 115) and registers with the shared MME (e.g., the second MME 117) so that its RPLMN ID (prefixing the allocated GUTI) is the wholesale network's 101 PLMN ID.

As seen above in the various architectures, the second RAN 115 is a shared network element in all of the architectures. The second MME 117 is also shared in all of the described architectures except for the MOCN architecture, and finally, the second SGW 119 is shared in the HR architecture, the MHR architecture, and the PMVNO architecture. Thus feature development for Wholesale Network Sharing is essentially concentrated in the wholesale network's 101 second RAN 115, second MME 117, and second SGW 119. UE support is also needed for some of these features, and finally some features may have impact on the partner network 103 at least in terms of additional configuration, as various embodiments described herein strive to avoid any new feature development at the elements of the partner network 103.

In an alternative embodiment the first UE 111 may not have its home at the partner network 103 but, rather, may have the wholesale network 101 as its home operator. In such an embodiment all of the components of the wholesale network 101 would be utilized by the first UE 111 in its communications with the wholesale network 101. As such, the architecture would be either the HR architecture or the MHR architecture.

In an embodiment in which a direct link is available between the first RAN 105 and the second RAN 115, a handover procedure in which the first UE 111 is being transferred from the partner network 103 to the wholesale network 101 may utilize the X2 Application Protocol. In this protocol a tunnel (illustrated in FIG. 1 as a an X2 link 110) is formed as a direct link between the first RAN 105 and the second RAN 115, and messages and data utilized in the handoff, such as handover requests, acknowledgments, uplink counts, downlink counts, or the like, are transferred directly between the first RAN 105 and the second RAN 115 without being sent through the first MME 107 or the second MME 117.

If no direct link is available between the first RAN 105 and the second RAN 115, the handover procedure may be performed utilizing an S1 Application Protocol. In this protocol messages and data, such as handover requests, acknowledgements, uplink counts, and downlink counts, are first transferred from an MME of the source network (e.g., the first MME 107 of the partner network 103) to the to the MME of the wholesale network 101 (e.g., the second MME 117 of the wholesale network 101) through a tunnel between the first MME 107 and the second MME 117 (illustrated in FIG. 1 as S1 link 112, which can handle both handoff and redirection). Then, once the second MME has the messages and information, the second MME 117 will send the uplink and downlink counts to the RAN of the receiving network (e.g., the second RAN 115 of the wholesale network 101) in the next MME status update.

However, while the S1 Application Protocol and the X2 Application Protocol are described as exemplary embodiments of handover protocols, these are intended to only be illustrative embodiments, and are not intended to limit the scope of the embodiments. Rather, any suitable handover protocol, such as the Inter-RAT handover protocol, may alternatively be utilized. All such protocols are fully intended to be included within the scope of the embodiments.

Additionally, while there is only a single partner network 103 illustrated in FIG. 1, there could be multiple partner networks 103 that may transfer UEs to the wholesale network 101 and utilize the resources of the wholesale network 101. Each one of these multiple partner networks 103 may have a different sharing architecture that connects the wholesale network 101 to the individual partner networks 103. For example, the partner network 103 illustrated in FIG. 1 may use a MOCV architecture to share resources with the wholesale network 101 while another partner network (not illustrated) may use a HR architecture to share resources with the wholesale network 101. As such, there are challenges to make the various aspects of network sharing work in many, most, or all cases through co-operation between the various network elements and identification of which of the partner networks 103 the individual UEs (e.g., the first UE 111) originated from given this mixture of architectures can become a challenge.

Additionally, the various elements of each network may be interconnected through, e.g., the S10 links 110 and X2 links 112. As one example, the second RAN 115 of the wholesale network 101 may be connected by an X2 link to both the first RAN 105 of the partner network and also to another RAN of a second partner network (not individually illustrated). As another example, the second RAN 115 of the wholesale network 101 may be connected to both the second MME 117 and the second SGW 119 of the wholesale network 101 as well as to both the first MME 107 and the first SGW 109 of the partner network 103 and also to an MME and SGW of another partner network. Any combination of suitable links between the various components of the shared network architecture may be utilized, and all such combinations are fully intended to be included within the scope of the embodiments.

In an embodiment mechanisms are created in the wholesale network 101 that can detect and track the partner network's 103 ID (not necessarily the partner network's 103 PLMN ID) associated with a UE (e.g., the first UE 111) registering or registered to the wholesale network 101. For this purpose, the Offloading/Mobility Management method that transferred a given UE (e.g., the first UE 111) to the wholesale network 101 is recorded and tracked. This function is supported at the second RAN 115 and may be required at the second MME 117. The output of this function will be a PLMN ID in all of the architectures except for the PMVNO architecture. In general, the wholesale network's 101 second RAN 115, second MME 117, and second SGW 119 support an internal "partner ID." As such, in all of the architectures (except for the PMVNO architecture wherein the first UE 111 is assumed without its own PLMN ID), there will be at least a one-to-one mapping between the first UEs 111 PLMN ID and an internal partner ID.

Additionally, there are embodiments in which a partner network 103 may have multiple brands within the partner network 103. In such an embodiment second UEs 121 may be part of a sub-brand (represented in FIG. 1 by the dashed circle 123), wherein the individual second UEs 121 may each have separate PLMN ID that have been mapped to a single PLMN ID in a many-to-one mapping. In this case, other shared RAN functions such as partner network 103 specific mobility management procedures and parameters, RFSP mapping and handling may still be performed on a per PLMN ID (as opposed to per internal partner ID) basis. In such an embodiment, there will be a many-to-one mapping between the first UE's 111 PLMN ID and an internal partner ID.

In an embodiment this mapping may be performed for the MOCN architecture, the MHR architecture, or the GWCN architecture. In other words, the broadcast PLMN ID for each partner network 103 may be a new PLMN ID obtained specifically for use in the wholesale network 101. This Mapped Broadcast PLMN ID helps to avoid broadcasting a PLMN ID for each of the partner network's 103 brands/MVNOs as done in the partner's own network. However, data is lost in such a mapping and the ambiguity leads to challenges in sending back the first UE 111 to the partner network 103 when the wholesale network 101 send back demands a one-to-many de-mapping. Without the embodiments described herein, the partner network's PLMN IDs have to be mapped one-to-one to an equivalent set of new PLMN IDs in the wholesale network 101.

The mapped broadcast PLMN ID also helps to sub-divide the partner network 103 for various purposes. Such purposes may include helping the partner network's 103 SGW/PGW/other dedicated CN elements to use the new PLMN ID information to track usage or performance in wholesale network 101. The mapped broadcast PLMN ID may also help to selectively offload certain partner (non-roamer) UEs to the wholesale network 101, or may help avoid coordinated TAI planning between various partner networks 103 in the wholesale network 101.

In an embodiment in which the PMVNO architecture is utilized, there will only be an internal partner ID, and there will not be a PLMN ID. In such an embodiment, Partner Identification will occur at the shared SGW (e.g., the second SGW 119). Further, such partner identification can be based on an International Mobile Subscriber Identity (IMSI).

The partner identification function at the wholesale network's 101 second RAN 115 and the appropriate second MME 117 second SGW 119 (depending upon the specific architecture chosen between the partner network 103 and the wholesale network 101) may be used in Network Sharing for the following functions: (1) Target MME (e.g., the second MME 117) Selection at the source MME (e.g., the first MME 107) during an S1 based handover; (2) SGW Selection at shared MME (e.g., the second MME 117) for proper routing of user plane traffic to/from shared RAN (e.g., the second RAN 115); (3) Shared RAN (e.g., the second RAN 115) Radio Resource Management/Capacity License Management functions such as Admission Control, Overload Control and Scheduling (efficient and fair) based on per partner quotas; (4) Subsequent Mobility Control at the shared RAN (e.g., the second RAN 115) with support for subsequent handovers also coming from an appropriate MME, which includes all aspects of mobility management related procedures performed for the first UE 111 at the shared RAN (e.g., the second RAN 115) on a per partner basis such as Handover, Redirection and Cell Reselection (tied in with UE and partner network 103 specific RFSP) related to Sending Back the first UE 111 to the appropriate partner network 103 as well as intra Wholesale Operator X2 based handover to a target RAN within the shared network 103; (5) GUTI (RPLMN) allocation, EPLMN List and TAI List allocation from appropriate MME to the first UE 111 in Initial NAS Accept messages; (6) Network Name Display at the first UE 111 (using EMM Information NAS Message from an appropriate MME to the first UE 111) (7) for the first RAN 105 to identify the GUMMEI relevant for the first UE 111 that is sent in an X2 Handover Request Message to the second RAN 115, the first RAN 105 needs to perform Partner Identification first; (8) Shared RAN (e.g., the second RAN 115) Radio Resource Management function to interpret and handle the partner network's 103 specific SPID/RFSPs; (9) Shared RAN (e.g., the second RAN 115) Radio Resource Management and DSCP marking functions to interpret and handle the partner network's 103 specific extended QCIs; (10) Shared RAN (e.g., the second RAN 115) UL backhaul Transport Resource Management (S1-U)based on per partner quotas; (11) Shared MME (e.g., the second MME 117) Capacity License Management function; (12) Shared SGW (e.g., the second SGW 119) Billing and Charging Functions for IP layer accounting on a per HR/MHR/PMVNO partner basis; (13) Shared SGW (e.g., the second SGW 119) DL backhaul Transport Resource Management function based on per partner quotas; (14) Shared SGW (e.g., the second SGW 119) Transport Resource Management and DSCP marking functions to interpret and handle the partner network's 103 specific extended QCIs; (15) Shared OSS/Shared RAN (e.g., the second RAN 115) Fault Management Alarms and Performance Management Counters reported on per partner basis.

In an embodiment the shared RAN (e.g., the second RAN 115) and the shared MME (e.g., the second MME 117) can support Partner Identification in a coordinated manner. For example, in an embodiment which uses an MME solution, the partner ID (which is the PLMN ID in all architectures except for the PMVNO architecture) associated with a partner network's 103 UE (e.g., the first UE 111) offloaded into or otherwise attached to the wholesale network 101 is identified at the shared MME (e.g., the second MME 117). The shared MME (e.g., the second MME 117) may do partner identification purely based on the partner UE's (e.g., the first UE 111) IMSI prefix (may not be available in certain cases as emergency attach) that maps to a partner ID, which is the PLMN ID in all cases except for the PMVNO architecture.

In an alternative embodiment which uses a RAN solution, the partner ID (which is the PLMN ID in all architectures except for the PMVNO architecture) associated with a partner network's 103 UE (e.g., the first UE 111) offloaded into or otherwise attached to the wholesale network 101 shall be identified at the shared RAN (e.g., the second RAN 115) and may be based or coordinated, in some cases, on the Partner Identification at the shared MME (e.g., the second MME 117). In other words, this function at the RAN will depend in some cases on the Partner Identification function at the shared MME (e.g., the second MME 117).

In some embodiments in which the Offload Method is an attach/redirect(TAU)/service request Initial NAS Messages or X2 (intra Wholesale Operator eNB) based handover or S1 based handover (pre-release 10), and given the case of an HR/EGWCN/PMVNO (equivalent PLMN ID based) partner network sharing architecture, an appropriately designed Handover Restriction List (HRL) Information Element (IE) in an appropriate S1 message sent from a cooperating shared MME (e.g., the second MME 117) to the shared RAN (e.g., the second RAN 115) is utilized to transfer the desired partner information.

However, in other embodiments where the Offload Method is not a handover such as an S1 or X2 based, multiple options exist for partner identification at the RAN. In an embodiment in which the Offload Method is an attach/redirect(TAU)/reselect(TAU)/service request that are all Initial NAS Messages sent by the first UE 111 in an RRCConnectionSetupComplete message and for the case of MHR/GWCN/MOCN (broadcast PLMN ID) architectures, one option is to use the first UEs 111 selected PLMN ID in the Radio Resource Control (RRC) message. Another option that may be utilized for an MHR/GWCN architecture is to obtain the partner ID from the serving PLMN sub IE of the Handover Restriction List (HRL) IE sent in the Initial Context Setup Request Message coming from the shared MME (dedicated MME of MOCN partner network 103 may not send a HRL IE). However, another option that may be utilized for a MOCN architecture (or cases with architectures like the MOCN architecture such as MHR or GWCN architectures with dedicated S1 interfaces to virtualized shared MME) is to use the unique PLMN ID attribute of the dedicated S1 interface. Similarly, for the case of S1 or X2 based handover under MHR/GWCN/HR/EGWCN network sharing architectures, two options (namely the Source-to-target RAN (e.g., the second RAN 115) transparent container with primary PLMN ID broadcast in SIB1, if a new or mapped PLMN ID is not broadcast for the MHR/GWCN cases, and an appropriately designed HRL IE sent from a cooperating shared MME) exist.

When multiple options are available for partner identification, one option may be to use a single "silver bullet." In such an embodiment the sending of the HRL IE by the shared MME (e.g., the second MME 117) is always mandated, and this HRL 300 may be utilized to transfer the desired information to determine the identify of the partner network 103. This HRL IE can be dictated to be always selected.

An exception to this is for the MOCN architecture wherein the GUMMEI (during an X2 based handover) and the unique PLMN ID attribute of the S1 interface (in all other cases) is always used since the HRL from the partner network 103 is optional. In this embodiment for all Offload Methods except for the X2 based handover, the unique PLMN ID attribute of the dedicated S1 interface carrying initial NAS messages from the shared eNB and S1 Handover Request Message to it may be used to transmit the information. Alternatively, for an X2 Offload Method handover, the solution of HRL IE sent from source Wholesale Operator eNB may be used in the intra Wholesale Operator eNB while the GUMMEI prefix in the X2 Handover Request Message may be used in the inter-Operator case.

Alternatively when multiple options are available for partner identification, an "hierarchy" may be used in which the HRL is first looked for. If the HRL is not available, another option, such as the selected PLMN ID/S1 attribute unique PLMN ID for the appropriate case, etc., can be adopted. Alternatively, in another embodiment a private sub IE in the HRL IE can be found to carry the partner network's 103 PLMN ID in all contexts. However, in such embodiments, while the parsing of the HRL 300 to extract the partner network's 103 PLMN ID may be dispensed with, additional complexity and interoperability issues may arise.

Optionally, implementation of the embodiments for a total solution can be incrementally developed in phases to accommodate an expanding mix of Network Sharing Architectures. For example, embodiments may be implemented into a network that already has a prior eNB product implementations for RAN sharing (e.g., an MOCN architecture—not wholesaling) that already uses the UE selected PLMN ID as the Partner Identification method for the Initial NAS message (encapsulated in RRCConnectionSetupComplete message) case of UE connecting/offloading to the eNB. Given this, implementation of the embodiments that provide a version that supports partner identification at the shared eNB for any mix of partners that only broadcast PLMN IDs, an exception may be applied to minimize implementation changes. In an embodiment the eNB in such cases uses the UE selected PLMN ID as Partner PLMN ID and conclude Partner Identification rather than wait for its confirmation from the shared MME via the HRL IE in a subsequent message.

Optionally, a consistency check may be utilized to find the solutions resulting from all the options available for a given case and check that they agree. If these are inconsistent, alarms may be triggered and if necessary, the corresponding UE request may be rejected with an appropriate cause code. In this regard, if the wholesale network's 101 MME (e.g., the second MME 117) does not include an HRL with the Handover Request message to the wholesale network's 101 second RAN 115 and the partner PLMN ID of a given UE (e.g., the first UE 111) cannot be unambiguously identified, then the Handover is rejected.

In an embodiment an HRL IE is crafted as a private convention between the shared MME (e.g., the second MME 117) and the shared RAN (e.g., the second RAN 115) for all cases of interest except for the MOCN architecture. In an MOCN architecture the unique PLMN ID attribute of S1 is used in all offload situations except the X2 based handover which uses the GUMMEI prefix. This concept can also be extended to cover all MOCN-like architectures which separate logical S1 scenarios to non-Wholesale Operator virtualized shared MMEs.

Figure 2A:
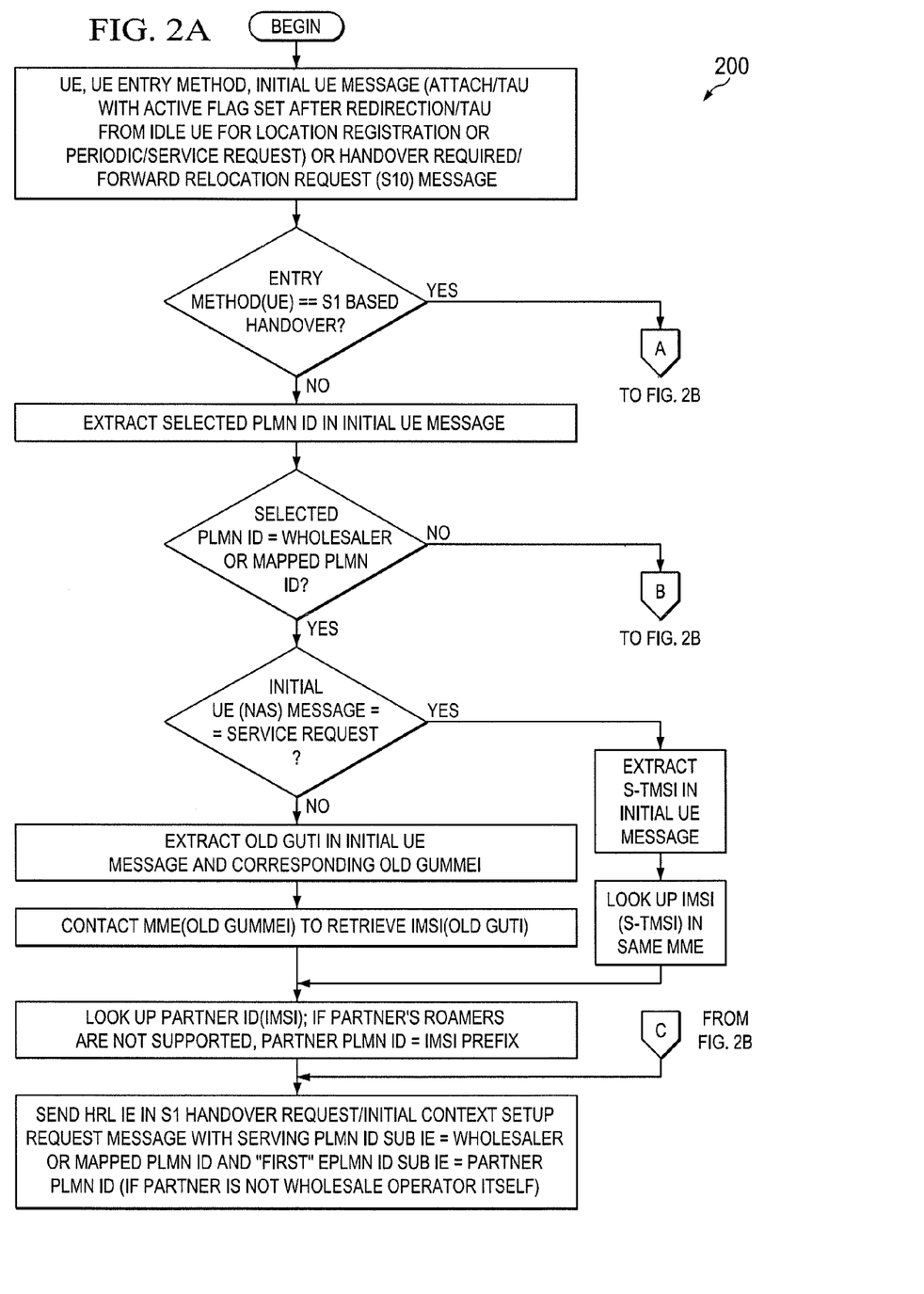
FIGS. 2A-2B illustrate a flowchart for partner identification at MME when using broadcast or equivalent PLMNIDs for various partners.
Figure 2B:
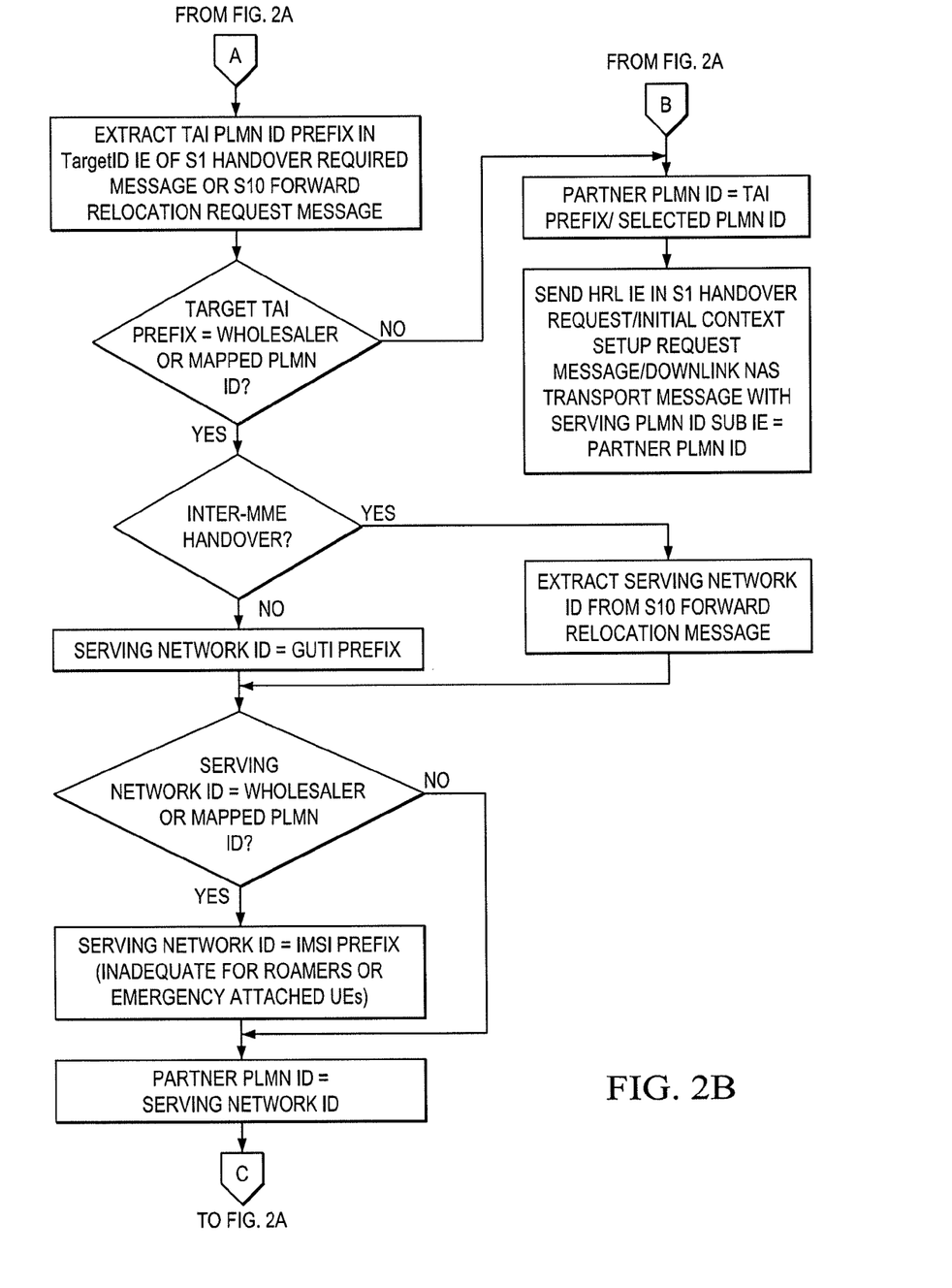

FIGS. 2A-2B illustrate an embodiment of a shared MME algorithm 200 for partner identification at a shared MME (e.g., the second MME 117). For partner identification at a shared MME, the partner ID at the shared MME (e.g., the second MME 117) is identified. The shared MME algorithm 200 at the shared MME (supporting arbitrary mix of broadcast and equivalent/mapped PLMN ID architectures) starts with the inputs of an arbitrary UE (e.g., the first UE 111) offloaded to the wholesale network 101 by any means applicable. Such an offloading may be performed using, e.g., a S1 or X2 based Handover, a Redirection (TAU with active flag), and a Reselection (TAU)). Other methods by which a UE may connect to the wholesale network 101, such as for Attaching, Service Requesting, or periodically Tracking Area updating, may also be utilized.

Alternatively, in those architectures in which the partner network 103 does not share the wholesale network's 101 second MME 117, such as in the MOCN architecture, parts of this method are adopted and implemented in the partner network's 103 first MME 107. One of ordinary skill in the art will recognize that these steps may also be performed by the partner network's 103 first MME 107, and such embodiments are fully intended to be included within the scope of the embodiments.

FIGS. 2A-2B describe the solution (logic) supported by the wholesale network's 101 (shared) MME in order to identify the partner associated with an arbitrary UE. The shared MME algorithm 200 offers one embodiment of a method based on the Offload Method and implicitly based on the Network Selection Architecture type of the partners, one that broadcasts their own PLMN IDs versus another that use the wholesale network's 101 PLMN ID as equivalent. In the flowchart, the type of offload method is considered.

In the case of an Initial NAS message from the first UE 111 (e.g., an Attach/Redirect TAU/Cell Reselection TAU/Periodic update TAU/Service Request), following the left branch of the flowchart in FIGS. 2A-2B, the shared MME (e.g., the second MME 117) first extracts the selected PLMN ID from the Initial UE Message (sent by the shared RAN (e.g., the second RAN 115) to transparently forward the NAS PDU). If the selected PLMN ID is not the wholesale network's 101 ID, it is indeed the partner network's 103 ID. If it is the wholesale network's 101 ID, then the ambiguity over all partners that treat the wholesale network 101 ID as equivalent (e.g., an HR/EGWCN/PMVNO architecture) is resolved by obtaining the first UE's 111 IMSI. In the case of a Service Request from the first UE 111, the second MME 117 maps the S-TMSI received in the initial first UE's 111 message to the IMSI. In other cases such as Attach and TAU (for any reason), the old GUMMEI taken from the old GUTI (that may represent the current MME) is used to contact the old (possibly current) MME to retrieve the first UE's 111 IMSI. Then a table that holds a relationship between the IMSI and the partner ID is used (for non-roamers the IMSI prefix indicates PLMN ID and for PMVNO, the fact that IMSI is from a special address space is used).

In a case of an S1 based handover, following the right branch of the flowchart in FIGS. 2A-2B, the shared MME (e.g., the second MME 117) extracts the target TAI prefix in a target ID IE of a Forward Relocation Request message from the source MME (e.g., the first MME 107) coming over the S10 link 112. If the target TAI prefix is not the wholesale network's 101 ID, then it is indeed the partner ID. If the target TAI is the wholesale network's 101 ID, then the ambiguity over all partners that treat the wholesale network 101 ID as an equivalent (e.g., in the HR/EGWCN architectures) is resolved. This is done by either obtaining the first UE's 111 IMSI as described above or by extracting the Serving Network IE from the Forward Relocation Request message from the source MME (e.g., the first MME 107) coming over the S10 link 112 that is the original PLMN ID of the partner network 103.

In all cases, it is possible to retrieve the first UE's 111 IMSI and use its prefix to identify the partner network 103 at the shared MME (e.g., the second MME 117). However, there may be some corner cases such as an Emergency Attach wherein the first UE's 111 IMSI may not be available at the shared MME (e.g., the second MME 117).

Once an output has been obtained from the shared MME algorithm 400, the output may be placed into a pre-designated location within a message to the second RAN 115. In an embodiment the format of a Handover Restriction List (HRL) 300 IE issued by the shared MME (e.g., the second MME 117) to the second RAN 115 uses a special private convention that is understood by the shared RAN (e.g., the second RAN 115) to allow for unambiguous partner identification in the Equivalent PLMN ID architecture cases such as HR/EG-WCN.

Figure 3A:
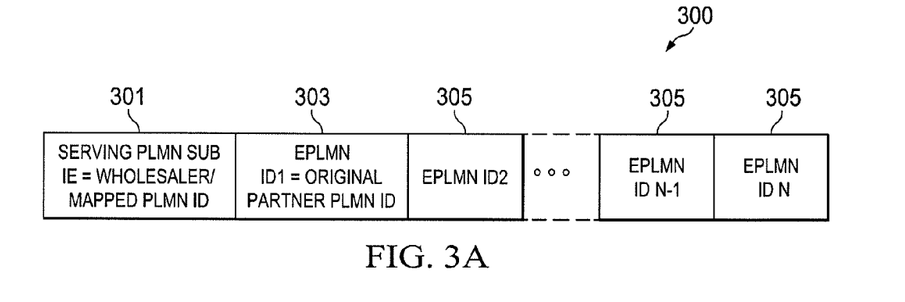
FIGS. 3A-3B illustrate structures of the Handover Restriction List when broadcasting an equivalent PLMNID for some partners.
Figure 3B:
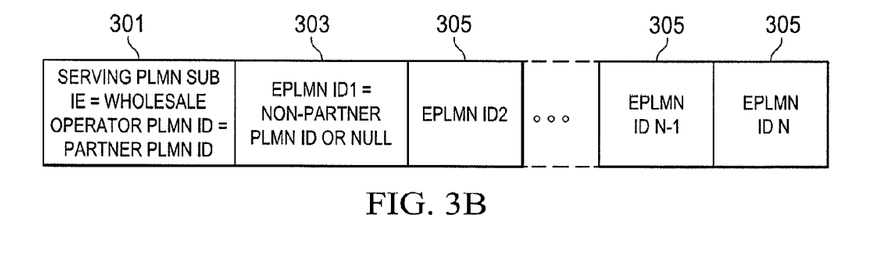

FIGS. 3A-3B illustrate formats for the HRL 300 when broadcasting an equivalent PLMNID, and shows a format with a convention known between the shared MME (e.g., the second MME 117) and the shared RAN (e.g., the second RAN 115) in order to support the case of partner architectures that use the wholesale network's 101 PLMN ID as an equivalent PLMN ID in the wholesale network 101 (as opposed to broadcasting their own).

In FIG. 3A a Serving PLMN ID sub IE 301 of the HRL 300 corresponds to the PLMN ID that is broadcast in the wholesale network 101 on behalf of the first UE's 111 partner network 103. This fits the definition in the standards of a Serving PLMN ID. In the cases where the partner network 103 broadcasts its own PLMN ID (such as broadcasting a "new" in use PLMN ID or else a mapped PLMN ID) such as in the MOCN, MHR, or GWCN architectures, the shared RAN (e.g., the second RAN 115) that looks at the Serving PLMN ID sub IE 301 immediately concludes the partner network's 103 identity (partner ID) unambiguously as shown above.

However in the HR, EGWCN, PMVNO architecture cases, this Serving PLMN ID sub IE 301 indicates the wholesale network 101. If this is the case, the shared RAN (e.g., the second RAN 115) will look at a predetermined location within the HRL 300, such as the first EPLMN ID sub IE 301 as shown above. If the EPLMN ID sub IE 301 is a PLMN ID of a known/recognized partner network such as the partner network 103 then that PLMN ID is indeed that of the home partner network. This is according to a special (private) convention between the second MME 117 (that constructs such an HRL 300) and the second RAN 115 that accords the first EPLMN ID sub IE 301 to the first UE's 111 home partner network 103. Other partner networks of the wholesale network 101 that also happen to be equivalent PLMNs will figure in other EPLMN ID sub IEs 305 locations instead of the pre-designated EPLMN ID sub IE 301 location. The same applies to other operators that are not partners of the wholesale network 101. This convention does not change the actual format of the HRL 300, but rather applies an ordered location, remaining compliant with the current standard since the actual partner network's 103 PLMN ID is one of the EPLMN sub IEs in order to facilitate send-back handovers/redirections to allowed cells/frequencies.

FIG. 3B illustrates a format of a HRL 300 in which the first EPLMN sub IE 303 is null or not a recognized partner but some other operator. In this embodiment, the wholesale network 101 (indicated in the serving PLMN sub IE 301) is indeed the correct partner network/PLMN ID associated with the first UE 111.

Note that this approach may be taken and extended further for the PMVNO architecture. In particular, UEs utilizing the PMVNO architecture may be clubbed with the wholesale network 101 and then these UEs may then use the wholesale network's 101 custom RFSP index as a private interface.

An embodiment uses an ordered set of EPLMN IDs in the EPLMN list of the HRL 300 for the purpose of relaying a certain number of EPLMN IDs chosen from a given fixed set in an unordered way from the partner network's 103 first MME 107 to the wholesale network's 101 second RAN 115 demands far fewer bits as all possible combinations of k EPLMN IDs picked from a set of n can be encoded with far fewer than $(\log_2 n)k$ bits. The redundancy in information bits provisioned is exploited by making the ordering information available to pre-designate a specific EPLMN ID field (or sub IE). For example, in an embodiment the EPLMN ID filed (or sub IE) that appears first in the order is designated to be special in the sense that it will carry the partner network's 103 original PLMN ID in those cases where the serving PLMN ID is an equivalent one or a mapped one and is insufficient by itself to resolve the partner network's 103 PLMN ID.

However, designating the "first" position in the list of PLMN IDs is not intended to be limiting. Rather, any location within the list of PLMN IDs of the handover restriction list may alternatively be used as long as it is a shared convention. For example, the last position within the list, any other suitable $n^{th}$ position, or even the first PLMN ID that may be recognized as a partner network 103, may alternatively be utilized, and all such designations are fully intended to be included within the scope of the embodiments.

This convention used in this embodiment may be considered private but does not change the format of the HRL 300. Other embodiments may alternatively be utilized, such as an embodiment that interchanges the serving PLMN ID sub-IE with the EPLMN sub-IE in the case where there were only two "allowed" PLMN IDs populating the HRL—thus the unique serving PLMN ID carries the unique original partner PLMN ID. However, this embodiment, while being an alternative embodiment that uses a private convention that works by the recipient, also causes a change to the format and violate the semantics prescribed in the standard for serving and EPLMN IDs, causing other repercussions in the second RAN 115 that may use the HRL.

Figure 4A:
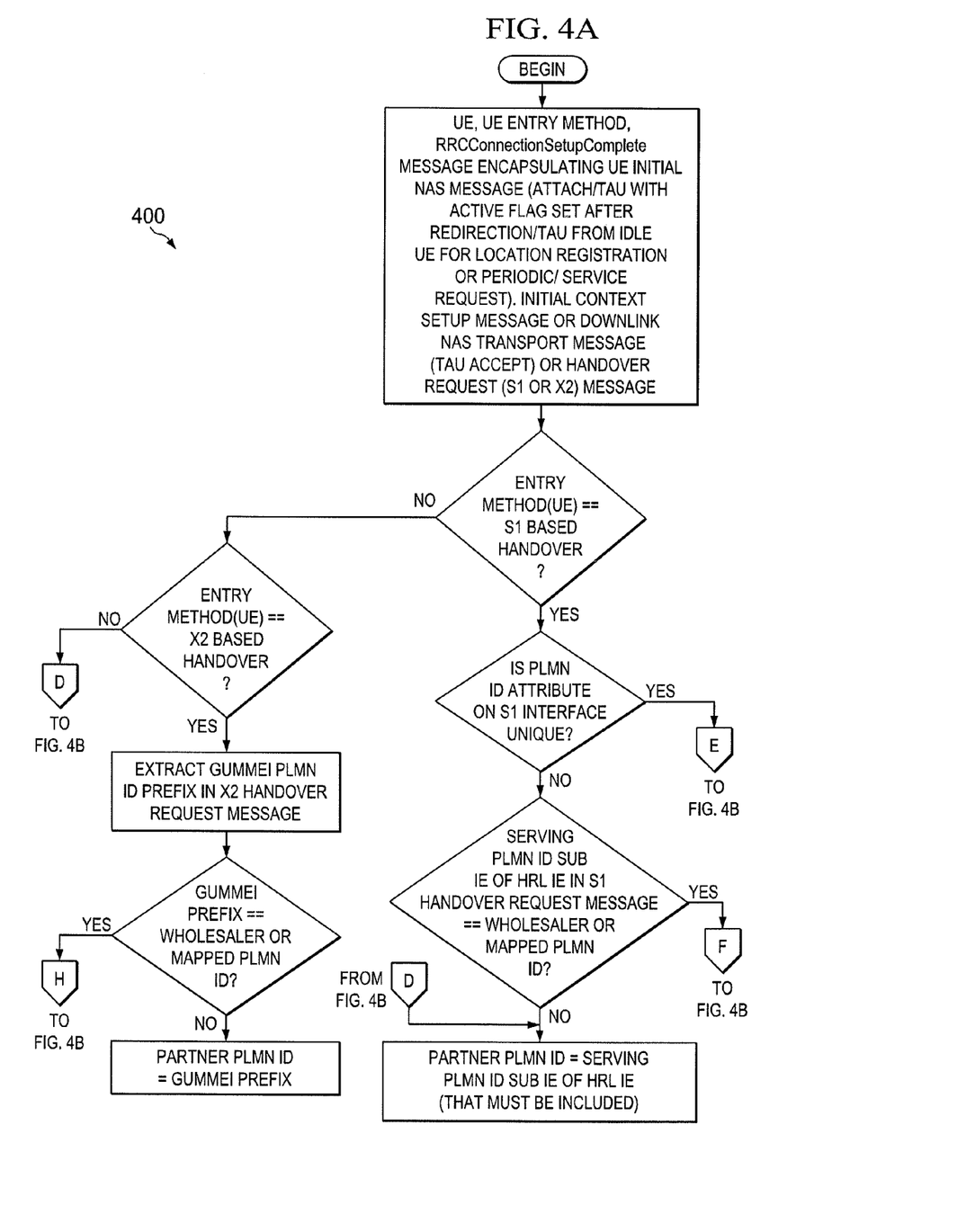
FIGS. 4A-4B illustrate a flowchart for partner identification at the shared eNB when using both broadcast of the partner's PLMNID and use of an equivalent PLMNID.
Figure 4B:
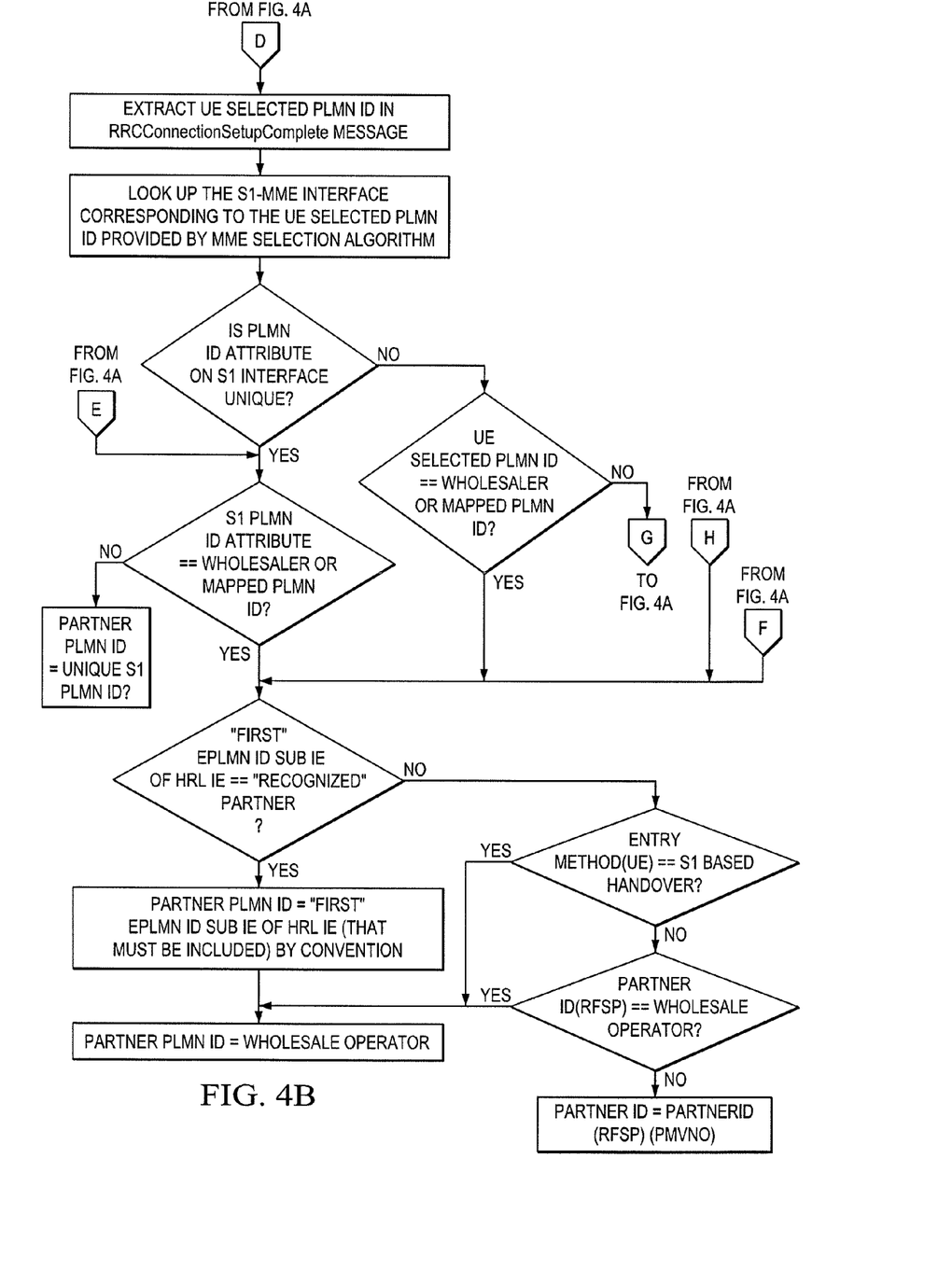

FIGS. 4A-4B illustrate another embodiment which utilizes a shared eNB algorithm 400 in which the partner identification functioning and processing is performed at the shared RAN (e.g., the second RAN 115). In this embodiment, another algorithm with the same purpose (Partner Identification) is supported at the shared MME (e.g., the second MME 117) and, in fact, the algorithm illustrated in FIGS. 4A-4B at the second RAN 115 depends in part on the output of its counterpart running on the second MME 117 when there is no S1 based handover or X2 based handover (e.g., in a direct attach). FIGS. 4A-4B illustrate a solution (logic) supported by the wholesale network's (shared) RAN (e.g., the second RAN 115) in order to identify the partner network 103 associated with an arbitrary UE offloaded to the wholesale network 101 by any means (S1 or X2 based Handover, Redirection (TAU with active flag), Reselection (TAU)) as well as those Attaching, Service Requesting, or periodically Tracking Area updating. FIGS. 4A-4B offer an appropriate method based on the Offload Method as well as discriminating between partners that have a single unique PLMN ID attribute on their logical S1-mme connection versus those that have multiple PLMN IDs on their logical S1-mme, and among the latter those who broadcast their own PLMN IDs versus those that use the wholesale network 101 PLMN ID as equivalent.

In an embodiment the shared eNB algorithm 400 starts by receiving or determining a number of inputs. In an embodiment the first input is the first UE 111 whose partner network 103 needs to be identified. Additionally, the shared eNB algorithm 400 also received or determines the UE Offload Method that is being utilized to transfer the first UE 111. In particular, the algorithm receives and/or determines whether the UE Offload Method is an S1 based Handover, an X2 based Handover, an Attach, TAU with Active Flag set after Redirection, TAU from Idle UE for Location Registration or Periodic Update, Service Request that are all Initial NAS Messages from the first UE 111.

The shared eNB algorithm 400 also receives or determines a number of messages. Depending on the Offload Method, the algorithm performs a number of inspections. If the offload is through an Initial NAS Message from the first UE 111, then the shared eNB algorithm 400 inspects the contents of the first UE's 111 RRCConnectionSetupComplete message that encapsulates the initial NAS message. In particular, the shared eNB algorithm 400 looks for the corresponding MME response that may either be a TAU Accept message (for TAU Requests) or an Initial Context Setup Request message (for other cases). Alternatively, in the case of an offload via an X2 based or an S1 based handover, the corresponding Handover Request message is inspected as an input.

As yet another input, the shared eNB algorithm 400 also receives or determines if there is a unique PLMN ID attribute on each S1-mme interface (e.g., MOCN) that is supported or not.

Finally, the shared eNB algorithm 400 receives or determine partner identification of any Idle UEs (for all Network Sharing Architecture cases that involve multiple PLMN IDs per S1 interface, such as MOCN like) that are temporarily RRC_CONNECTED to the shared eNB (and ECM_CONNECTED by an S1 connection to the second MME 117 (e.g., the second MME 117)). This identification of Idle UEs may be performed in order to complete a Tracking Area Update (TAU) procedure either periodically or for Location Registration (LR) reasons and is performed using the HRL IE from the wholesale network's 101 MME (e.g., the second MME 117). This step is used to provide the first UEs 111 partner network 103 specific (and possibly subscriber specific via RFSP) dedicated cell reselection priorities.

From these inputs, the shared eNB algorithm 400 makes an initial determination of which handover method is being utilized by initially deciding if the entry method is an S1 based handover. If the entry method is an S1 based handover, then it is determined whether the PLMN ID on the S1 interface is unique. If it is not unique, then it is determined if the Serving PLMN ID sub IE of the HRL IE in the S1 Handover Request Message is equal to the wholesale network's 101 PLMN ID, in the case of mapped PLMN IDs, whether it is equal to the mapped PLMN ID. If it is not equal to either one, then the Partner network's 103 PLMN ID=Serving PLMN ID sub IE of the HRL IE.

If the Serving PLMN ID sub IE of the HRL IE in the S1 Handover Request Message is equal to either the wholesale network's 101 PLMN ID or the mapped PLMN ID, then a determination is made whether the pre-determined (in some embodiments the "first") EPLMN ID sub IE of the HRL IE is equal to a recognized partner network 103. If it is, then the partner network's 103 partner PLMN ID is the pre-determined (in some embodiments the "first") EPLMN ID sub IE of the HRL IE.

If the pre-determined (in some embodiments the "first") EPLMN ID sub IE of the HRL IE is not equal to a recognized partner network 103 then another decision is made based on the type of handover that is being used. If an S1 based handover is being used, then the partner network's 103 PLMN ID is the wholesale network 101.

If an S1 based handover is not being used, then it is determined whether the PartnerID(RFSP) is the wholesale network's 101. If it is, then the partner network's 103 PLMN ID is the wholesale network 101. If it is not, then the partner network's 103 ID is the PartnerID(RFSP). In particular, in an embodiment in which the PMVNO architecture is utilized, another "private" convention is used wherein the wholesale network 101 privately allocates a subset of the 128 custom radio access technology frequency selection priority (RFSP)/SPIDs available for its use to each PMVNO partner. This private convention/rule on the RFSP space of the wholesale network 101 is known to the shared MME (e.g., the second MME 117) supporting the PMVNO architecture and all the shared RANs (e.g., the second RAN 115). Thus partner identification at the second RAN 115 for UEs 111 within the PMVNO architecture is performed based on extracting these RFSP values in the case the partner identification steps have ruled out any other partner network 103 but the wholesale network 101 itself or its PMVNO partners. These RFSP/SPIDs potentially appear in all the signaling messages from the shared MME (e.g., the second MME 117) or shared RAN (e.g., the second RAN 115) to shared RAN and in fact, they are transmitted from shared MME supporting PMVNOs and all shared RANs. Additionally, such a requirement is not imposed on the partner network's 103 first RAN 105 that offloaded the first UE 111 by an S1 based handover in which case the partner network's 103 RAN 105 includes it in the source-to-target transparent container.

Returning to the decision as to whether or not the PLMN ID attribute on the S1 interface is unique, if the PLMN ID attribute on the S1 interface is unique, then it is determined whether or not the S1 PLMN ID attribute equals either the wholesale network's 101 PLMN ID or else a mapped PLMN ID. If it does not equal either one of these, then the partner network's 103 PLMN ID is the unique S1 PLMN ID. If it is equal to one of these, then a determination of whether the pre-determined (in some embodiments the "first") EPLMN ID sub IE of the HRL IE is equal to a recognized partner network 103. The shared eNB algorithm 400 may then proceed from this decision as described above.

If the shared eNB algorithm 400 determines that the handover method is an X2 based handover, the shared eNB algorithm 400 will extract the GUMMEI PLMN ID prefix in the X2 Handover Request Message and determine if the GUMMEI prefix equals either the wholesale network's 101 PLMN ID or else a mapped PLMN ID. If the GUMMEI prefix does equal one of these, then a determination of whether the pre-determined (in some embodiments the "first") EPLMN ID sub IE of the HRL IE is equal to a recognized partner network 103, and the shared eNB algorithm 400 may proceed from this decision as described above. If the GUMMEI prefix does not equal one of these, then the Partner PLMN ID is the GUNNEI prefix.

If the handover request is neither an S1 based request or an X2 based request, then the shared eNB algorithm 400 will extract the UE Selected PLMN ID in the RRC Connection-SetupComplete Message, and look up the S1-mme interface corresponding to the UE selected PLMN ID provided by the shared MME algorithm 200 (described above with respect to FIGS. 2A-2B). If the PLMN ID attribute on the S1 interface is unique, then a determination is made at to whether the S1 PLMN ID attribute is equal to either the wholesale network's 101 PLMN ID or else a mapped PLMN ID, and the shared eNB algorithm 400 may proceed from this decision as described above.

If the PLMN ID attribute on the S1 interface is not unique, then a determination is made as to whether the UE Selected PLMN ID is equal to either the wholesale PLMN ID or a mapped PLMN ID. If it is equal to either one, then a determination of whether the pre-determined (in some embodiments the "first") EPLMN ID sub IE of the HRL IE is equal to a recognized partner network 103, and the shared eNB algorithm 400 may proceed from this decision as described above. If it is not equal to either one, then the partner PLMN ID is the Serving PLMN ID sub IE of the HRL IE.

The shared RAN (e.g., the second RAN 115) maintains a table of "Recognized Partners" that should be configured by OA&M. These are the PLMN IDs of partner networks 103 that the wholesale network 101 supports (including the PLMN ID of the wholesale network 101 itself).

When completed, the shared eNB algorithm 400 illustrated in FIGS. 4A-4B will output a correct partner ID (that is not necessarily the PLMN ID) for all cases of offload methods and network sharing architectures. Additionally, the shared eNB algorithm 400 will output the partner PLMN ID for all these cases without ambiguity at the shared RAN for every UE that is RRC Connected to this shared RAN, with the exception of the general case of a PMVNO architecture that does not possess its own PLMN ID. The partner ID and partner PLMN ID may then be used for various purposes such as tracking resource utilizing and billing.

The algorithms described herein (e.g., the shared MME algorithm 200 and the shared eNB algorithm 400) are applicable for both those partner Network Sharing architectures that involve a PLMN ID broadcast such as the MOCN, MHR, and GWCN architectures and also for those partner Network Sharing architectures that do not such as the HR and EGWCN architectures. As such, the algorithms can support an arbitrary mix of both Broadcast and Equivalent PLMN ID partner network sharing architectures.

Figure 5:
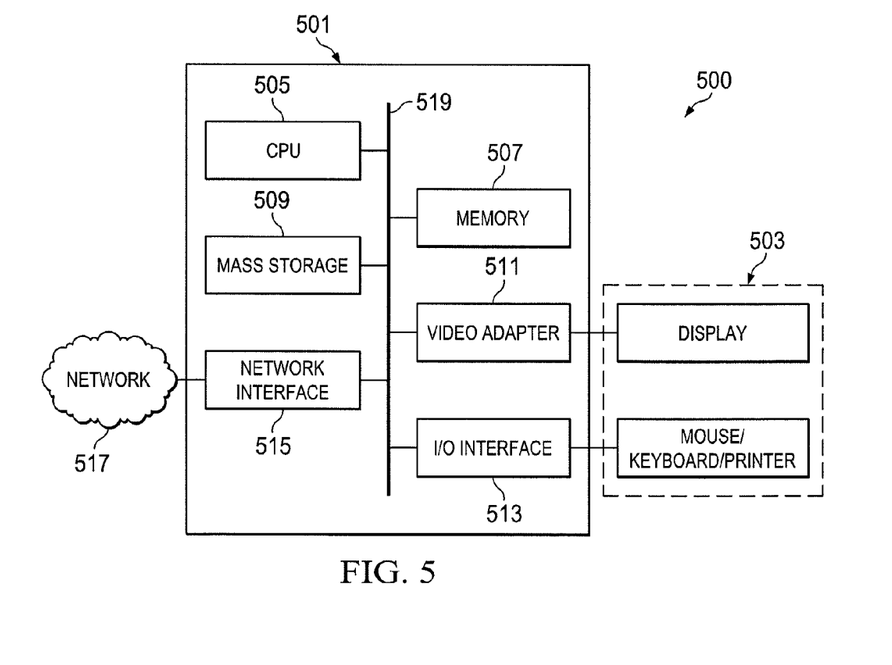
FIG. 5 is a block diagram illustrating a computing platform that may be used for implementing, for example, the devices and methods described herein, in accordance with an embodiment.

FIG. 5 is a block diagram of a processing system 500 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 501 equipped with one or more input/output devices 503, such as a speaker, microphone, mouse, touchscreen, keypad, keyboard, printer, display, and the like. The processing unit may include a central processing unit (CPU) 505, memory 507, a mass storage device 509, a video adapter 511, and an I/O interface 513 connected to a bus 519.

The bus 519 may be one or more of any type of several bus architectures including a memory bus or memory controller, a peripheral bus, video bus, or the like. The CPU 505 may comprise any type of electronic data processor. The memory 507 may comprise any type of system memory such as static random access memory (SRAM), dynamic random access memory (DRAM), synchronous DRAM (SDRAM), read-only memory (ROM), a combination thereof, or the like. In an embodiment, the memory 507 may include ROM for use at boot-up, and DRAM for program and data storage for use while executing programs.

The mass storage device 509 may comprise any type of storage device configured to store data, programs, and other information and to make the data, programs, and other information accessible via the bus. The mass storage device 509 may comprise, for example, one or more of a solid state drive, hard disk drive, a magnetic disk drive, an optical disk drive, or the like.

The video adapter 511 and the I/O interface 513 provide interfaces to couple external input and output devices to the processing unit 501. As illustrated, examples of input and output devices include the display coupled to the video adapter 511 and the mouse/keyboard/printer coupled to the I/O interface 513. Other devices may be coupled to the processing unit 501, and additional or fewer interface cards may be utilized. For example, a serial interface card (not shown) may be used to provide a serial interface for a printer.

The processing unit 501 also includes one or more network interfaces 515, which may comprise wired links, such as an Ethernet cable or the like, and/or wireless links to access nodes or different networks. The network interface 515 allows the processing unit 501 to communicate with remote units via the networks 517. For example, the network interface 515 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of partner identification in a shared network entity, the method comprising:
   generating a handover communication by the shared network entity including a processor of the shared network entity, wherein the generating the handover communication comprises:
      generating a list of one or more equivalent identifications, wherein one of the one or more equivalent identifications is an identifier of an originating partner network;
      placing the identifier of the originating partner network into a pre-agreed location within the list of one or more equivalent identifications within the handover communication, wherein the pre-agreed location is determined prior to the generating the list of one or more equivalent identifications; and
   transmitting the handover communication from the shared network entity.

2. The method of claim 1, wherein the handover communication is a handover restriction list.

3. The method of claim 1, wherein the generating a list of one or more equivalent identifications further comprises generating a list of equivalent Public Land Mobile Network (PLMN) IDs.

4. The method of claim 3, wherein the identifier of the originating partner network is a PLMN ID of the partner network.

5. The method of claim 3, wherein the identifier of the originating partner network is a PLMN ID of a non-partner network.

6. The method of claim 3, wherein the identifier of the originating partner network is a null.

7. The method of claim 1, wherein the placing the identifier of the originating partner network into a pre-agreed location within the handover communication further comprises placing the identifier of the originating partner network into a first position within a list of equivalent PLMN IDs.

8. The method of claim 1, wherein the placing the identifier of the originating partner network into a pre-agreed location within the handover communication further comprises placing the identifier of the originating partner network as a first known partner network.

9. A shared network entity comprising:
   a memory; and
   a processor coupled to the memory and configured to:
      generate a handover communication with a list of public landmobile network (PLMN) IDs, wherein the generating the handover communication comprises placing an indication of a partner network identification into a pre-agreed location within the list of PLMN IDs within the handover communication, wherein the pre-agreed location is agreed upon prior to the placing the indication of the partner network identification into the pre-agreed location; and
      send the handover communication for transmission.

10. The shared network entity of claim 9, wherein the handover communication is a handover restriction list.

11. The shared network entity of claim 9, wherein the pre-agreed location is a first location in a list of equivalent PLMN IDs.

12. The shared network entity of claim 9, wherein the pre-agreed location is a first known partner network in a list of equivalent PLMN IDs.

13. The shared network entity of claim 9, wherein the indication of the partner network identification is a PLMN ID of the partner network.

14. The shared network entity of claim 9, wherein the indication of the partner network identification is a PLMN ID of a non-partner network.

15. The shared network entity of claim 9, wherein the indication of the partner network identification is a null.

16. The shared network entity of claim 9, wherein the shared network entity is an eNB.

17. The shared network entity of claim 9, wherein the shared network entity is a mobility management entity.

18. A method of partner identification in a shared network entity, the method comprising:
   receiving a handover communication, the handover communication comprising a list of equivalent public landmobile network (PLMN) IDs; and
   analyzing the handover communication using a processor of the shared network entity, the analyzing the handover communication further comprising looking in a pre-arranged location within the list of equivalent PLMN IDs to find an indication of an originating partner network identity, wherein the pre-arranged location is known by the shared network entity prior to the receiving the handover communication.

19. The method of claim 18, wherein the handover communication is a handover restriction list.

20. The method of claim 18, wherein the pre-arranged location is a first location in the list of equivalent PLMN IDs.

21. The method of claim 18, wherein the pre-arranged location is a first known partner network.

22. The method of claim 18, wherein the indication of the originating partner network identity is a PLMN ID of the partner network.

23. The method of claim 18, wherein the indication of the originating partner network identity is a PLMN ID of a non-partner network.

24. The method of claim 18, wherein the indication of the originating partner network identity is a null.

25. A shared network entity comprising:
   a memory; and
   a processor coupled to the memory and configured to:
      receive a handover communication; and
      analyze the handover communication, wherein the analyzing the handover communication further comprises looking in a pre-arranged location within a list of equivalent Public Land Mobile Network (PLMN) IDs within the handover communication to find an indication of a partner network identity, wherein the shared network entity knows the pre-arranged location prior to the receiving the handover communication.

26. The shared network entity of claim 25, wherein the handover communication is a handover restriction list.

27. The shared network entity of claim 25, wherein the pre-arranged location is a first location in the list of equivalent PLMN IDs.

28. The shared network entity of claim 25, wherein the shared network entity is a mobility management entity.

29. The shared network entity of claim 25, wherein the shared network entity is a radio access network.

30. The shared network entity of claim 25, wherein the indication of the partner network identity is a PLMN ID of the partner network.

31. The shared network entity of claim 25, wherein the indication of the partner network identity is a PLMN ID of a non-partner network.

32. The shared network entity of claim 25, wherein the indication of the partner network identity is a null.

33. A method of determining a partner identification (ID) by a shared network entity, comprising:
    receiving a non-access stratum (NAS) message from a user equipment (UE) via another network entity;
    extracting a public land mobile network (PLMN) ID from the NAS message;
    when the extracted PLMN ID is not a wholesale operator ID, then using the PLMN ID as the partner ID;
    when the extracted PLMN ID is the wholesale operator ID, then
        obtaining an international mobile subscriber identity (IMSI) for the UE, and
        determining the partner ID in accordance with the IMSI for the UE; and
    sending a handover restriction list (HRL) with the partner ID in a pre-arranged location within a list of equivalent PLMN IDs within the handover restriction list.

34. The method of claim 33, wherein the pre-arranged location is a first position in the list of equivalent PLMN IDs.

35. A shared network entity comprising:
    a memory;
    a processor coupled to the memory and configured to:
        receive a non-access stratum (NAS) message from a user equipment (UE) via another network entity;
        extract a public land mobile network (PLMN) identification (ID) from the NAS message;
        when the extracted PLMN ID is not a wholesale operator ID, then use the PLMN ID as a partner ID;
        when the extracted PLMN ID is the wholesale operator ID, then
            obtain an international mobile subscriber identity (IMSI) for the UE, and
            determine the partner ID in accordance with the IMSI for the UE; and
        wherein the processor is further configured to send a handover restriction list (HRL) with the partner ID in a pre-arranged location within a list of equivalent PLMN IDs within the HRL.

36. The shared network entity of claim 35, wherein the pre-arranged location is a first position in the list of equivalent PLMN IDs.

37. The shared network entity of claim 35, wherein the shared network entity is a mobility management entity.

38. A method of determining a partner identification (ID) by a shared network entity, comprising:
    receiving a connection message from a user equipment (UE) via another network entity;
    extracting an indication of identity from the connection message;
    when the indication of identity is a wholesale network identity, analyze a handover communication with a processor of the shared network entity, the analyze the handover communication comprising looking in a pre-arranged location within a list of identities within a handover communication to determine an origination identity of the user equipment; and
    when the indication of identity is a mapped identity, analyze the handover communication with the processor of the shared network entity, the analyze the handover communication comprising looking in a pre-arranged location within a handover communication to determine the origination identity of the user equipment.

39. The method of claim 38, wherein the handover communication is a handover restriction list.

40. The method of claim 39, wherein the pre-arranged location is a first position in a list of equivalent Public Land Mobile Network (PLMN) IDs.

41. The method of claim 38, wherein the shared network entity is a shared radio access network.

42. The method of claim 38, further comprising when the origination identity is part of a radio access technology frequency selection priority list.

43. A shared network entity comprising:
    a memory; and
    a processor coupled to the memory and configured to:
        receiving a connection message from a user equipment (UE) via another network entity;
        extracting an indication of identity from the connection message;
        when the indication of identity is a wholesale network identity, look in a pre-arranged location within a handover restriction list to determine an origination identity of the user equipment; and
        when the indication of identity is a mapped identity, look in a pre-arranged location within a handover restriction list to determine the origination identity of the user equipment.

44. The shared network entity of claim 43, wherein the shared network entity is an eNB.

45. The shared network entity of claim 43, wherein the pre-arranged location is a first position in a list of equivalent Public Land Mobile Network (PLMN) IDs.

46. The shared network entity of claim 43, wherein the connection message is a handover restriction list.

* * * * *